(12) United States Patent
Kershaw

(10) Patent No.: US 6,246,825 B1
(45) Date of Patent: Jun. 12, 2001

(54) LIQUID FILLED OPTICAL WAVEGUIDE

(75) Inventor: Stephen V Kershaw, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/155,103

(22) PCT Filed: Apr. 22, 1998

(86) PCT No.: PCT/GB98/01172

§ 371 Date: Sep. 21, 1998

§ 102(e) Date: Sep. 21, 1998

(87) PCT Pub. No.: WO98/48304

PCT Pub. Date: Oct. 29, 1998

(30) Foreign Application Priority Data

Apr. 22, 1997 (EP) .................................................. 97302750

(51) Int. Cl.[7] .................................................. G02B 6/10
(52) U.S. Cl. .............................................. 385/132; 385/125
(58) Field of Search ................................... 385/125, 129, 385/130–132

(56) References Cited

U.S. PATENT DOCUMENTS

| 5,394,239 | 2/1995 | Valette | 356/345 |
| 5,473,721 | * 12/1995 | Myers et al. | 385/129 |

FOREIGN PATENT DOCUMENTS

| 2038285 | 7/1970 | (DE) . |
| 4212392 A1 | 4/1992 | (DE) . |
| 0534590 A1 | 3/1993 | (EP) . |
| 0679881 A1 | 11/1995 | (EP) . |
| 1-97841 | 4/1989 | (JP) . |
| 01097841 | * 4/1989 | (JP) . |
| WO 92/06394 | 4/1992 | (WO) . |
| WO 96/10282 | 4/1996 | (WO) . |

OTHER PUBLICATIONS

Patent Abstracts of Japan, vol. 13, No. 337, Jul. 28, 1989 & JP 01 097841A (Hitachi Ltd.) Apr. 17, 1989.
Patent Abstracts of Japan, vol. 006, No. 096 (P–120), Jun. 4, 1982 & JP 57 030803 A(Olympus Optical Co Ltd), Feb. 19, 1982.
McCormick et al, "Microengineering Design and Manufacturing Using the LIGA Process", Engineering Science and Education Journal, Dec. 1994, pp. 255–262.
Kanbara et al, "Optical Kerr Shutter Using Organic Nonlinear Optical Materials in Capillary Waveguides", IEEE Photonics Technology Letters, vol. 3, No. 9, Sep. 1991, pp. 795–797.
Kashyap et al, "Nonlinear Polarization Coupling and Instabilities in Single–Mode Liquid–Cored Optical Fibers", Optics Letters, vol. 17, No. 6, Mar. 15, 1992, pp. 405–407.
Manning et al, "Ultrafast Refractive Nonlearity Displayed by Organic Monomode Fibre Waveguides", Integrated Photonics Research Topical Meeting, Palm Springs, USA, Mar. 1993.

* cited by examiner

Primary Examiner—Hemang Sanghavi
Assistant Examiner—Michelle R. Connelly-Cushwa
(74) Attorney, Agent, or Firm—Nixon & Vanderhye P.C.

(57) ABSTRACT

A planar optical waveguide has a liquid filled wave guiding region, which may be straight, coiled or otherwise folded, with filling channels provided transversely along its length. The wave guiding region may be fabricated in a substrate with a reservoir on the substrate to facilitate filling through the filling channels.

21 Claims, 3 Drawing Sheets

LIQUID FILLED OPTICAL WAVEGUIDE

BACKGROUND OF THE INVENTION

1. Field of the Invention

This invention relates to a planar liquid filled optical waveguide, which has particular but not exclusive application as a fast all optical switching device for time division multiplexing (TDM) network architectures and sub-systems.

2. Related Art

In a TDM network, low bit rate data streams, typically at 64 kbits/sec per telephony channel, derived from digital sources such as modems and digitally sampled analogue sources such as telephones, together with other information such as billing data, are multiplexed for transmission across the network by interleaving the signals in time to create a much higher bit rate signal, at up to 1 Gbit/sec or greater, but typically at 500 Mbits/sec. All-optical switching devices may be used in such systems to provide functions such as optically controlled modulation and all-optical clock signal recovery in high frequency systems.

Liquid filled optical waveguides are known. Reference is directed to our Publication Number WO 96/10282; "Optical fibre with quantum dots", in which a hollow tubular glass cladding is filled with a colloidal solution of quantum dots through an opening at either end. The principle extends to a planar waveguide where, for example, the waveguide is a channel formed in a substrate.

Although the method of end filling is suitable for short lengths of waveguide, it becomes increasingly difficult to fill longer lengths in this way. This is partly due to the viscous drag at the liquid/waveguide interface and partly the increasing chance that impurities at this interface will cause only partial wetting, which may stop the filling process entirely. Longer waveguide lengths are desirable as they may enable the device to operate with lower powered sources than would otherwise be possible, in turn reducing the risk of optical damage to certain materials which have useful optical properties and which may be used in the construction of such devices. Whilst the application of reduced or increased pressure may be used to assist the process of end filling, this may not be possible with materials such as volatile liquids.

U.S. Pat. No. 5,473,721 discloses a multi-mode optical circuit in which channels for receiving optical fibres are machined into a substrate. The channels can be filled with liquid through transversely arranged filling passages, the liquid in the wave guiding region so formed being confined by the ends of the optical fibres inserted into the machined channels. U.S. Pat. No. 5,394,239 discloses a solid optical waveguide in the form of a coil on a substrate.

SUMMARY OF THE INVENTION

According to the present invention, there is provided a planar optical waveguide comprising an elongate liquid filled wave guiding region on a substrate, the liquid being confined within the waveguide after filling, wherein the ends of the wave guiding region are defined by respective regions of the substrate, further comprising a filling channel for filling the wave guiding region arranged transversely to its length.

An advantage associated with examples of this invention is that the difficulty involved in fabricating long liquid filled waveguides can be reduced. A further advantage is that optical coupling to the liquid waveguide is not hindered by the presence of glue or other sealant necessary to retain the liquid in an end-filled waveguide configuration.

The filling channel can be sealed after filling, although the surface tension of the liquid within the waveguide may be sufficient to confine the liquid within it.

To further enhance optical coupling, the waveguide may include a short section of solid waveguide introduced between the substrate edge and the liquid filled channel.

The invention may be implemented by forming a coiled or otherwise folded liquid filled waveguide on a substrate, with filling channels arranged radially to connect the waveguide to a reservoir fabricated in the substrate. In accordance with the invention there is provided a planar optical waveguide comprising an elongate liquid filled wave guiding region and a filling channel arranged transversely to its length, wherein the wave guiding region is in the form of a coil having a plurality of turns, and the channel connects to the wave guiding region at each of at least two of the turns of the coil. An advantage of these arrangements is that it is possible to construct a device with long overall path lengths while at the same time minimising device size.

The waveguide may include a plurality of filling channels, each of which connects to the wave guiding region at each of at least two of the turns of the coil. One or more filling channels may connect to each of the turns of the coil, advantageously allowing simultaneous filling of each turn or part of a turn.

In accordance with the invention, there is further provided apparatus for producing a planar optical waveguide with a liquid filled wave guiding region, comprising a planar optical waveguide having an elongate hollow wave guiding region and a filling channel arranged transversely to the length of the wave guiding region to enable filling of the wave guiding region by capillary action from an external source, and a reservoir for immersing the waveguide in a liquid contained therein so as to fill the wave guiding region with the liquid.

There is also provided, in accordance with the invention, a method of manufacturing a planar optical waveguide having a liquid filled wave guiding region, comprising the steps of providing a substrate having an elongate channel for forming the wave guiding region wherein the ends of the channel are defined by respective regions of the substrate, forming a filling channel in the substrate transversely to the length of the guiding region, and filling the wave guiding region with a liquid by capillary action through the filling channel, such that the liquid is confined within the waveguide.

BRIEF DESCRIPTION OF THE DRAWINGS

Embodiments of the invention will now be described by way of example with reference to the accompanying drawings, in which.

DETAILED DESCRIPTION OF THE DRAWINGS

Figure 1:
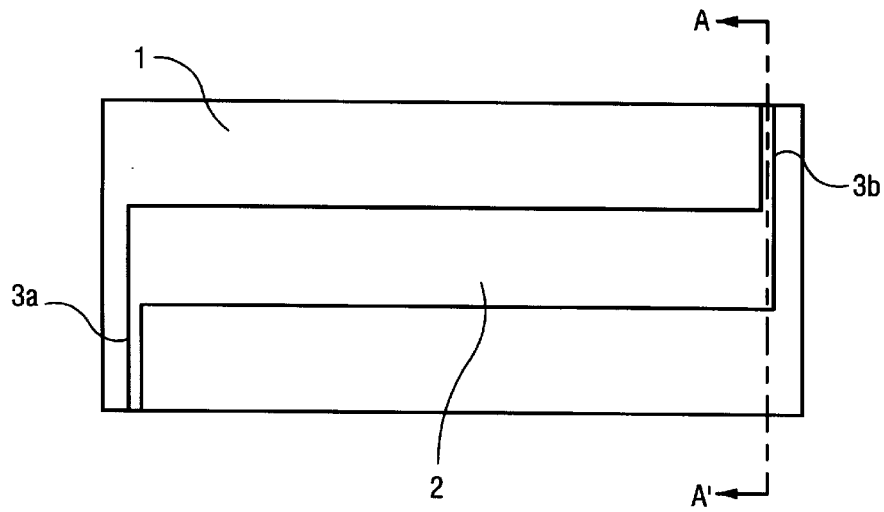
FIG. 1 is a plan view of a device in accordance with the first embodiment.

Referring to FIG. 1, a first embodiment of the device consists of an elongate rectangular substrate 1 of photosensitive glass, for example, 1 mm thick Hoya PEG-3 glass made by Hoya Corporation, Tokyo, Japan. The glass is exposed to light through a mask to produce the pattern shown in FIG. 1. For example, a 600 W mercury-xenon lamp can be used to expose the glass to ultra-violet (UV) radiation of wavelength 300–320 nm through a chrome on quartz photo-mask, to produce the pattern shown. The wave guiding region 2 comprises an elongate, rectangular trough which runs centrally along one of the major faces of the substrate 1, but stops short of its ends. The wave guiding region is typically 2–10 µm wide and 5 cm long. As will be explained later, the trough 2 is filled with a liquid such as a metal dithiolene solution, and in order to fill the trough with the liquid, filling channels 3a, 3b extend at right angles to the length of the trough 2, at its opposite ends, to side edges of the substrate 1. The channels 3a and 3b are typically 1–10 µm wide.

Figure 2:
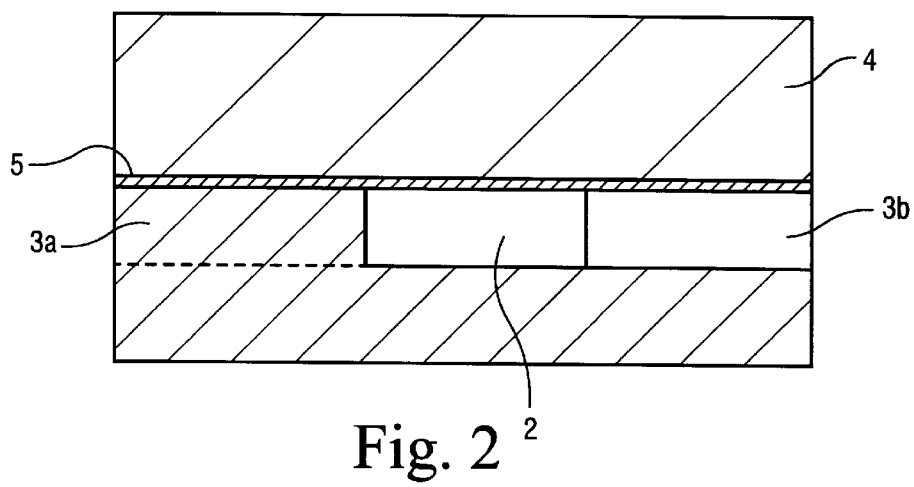
FIG. 2 is a schematic sectional view of the device in FIG. 1 taken along the line A–A'.

The pattern is developed in order to form the trough 2 and the filling channels 3a, 3b by heat-treatment of the glass. Typically, the glass is heated to 350° C. at the rate of 150° C. per hour, then heated to 590° C. at 60° C. per hour, and maintained at that temperature for 45 minutes. Finally, it is allowed to cool at 100–150° C. per hour to room temperature, when the whole structure is re-exposed to UV radiation for 5–10 seconds. The glass is then etched with 4–5% hydrofluoric acid to a depth of 1–10 µm, at a rate of approximately 20 µm per minute, to form the channels shown in FIG. 2. An optional crystallisation process may then be carried out to remove the photosensitivity of the unexposed regions. This involves maintaining the glass at a temperature of 800–900° C. for 2 hours.

A superstrate 4 is glued onto the substrate 1 so as to close the wave guiding region 2. The superstrate 4 is made of standard 1 mm thick glass, for example, a microscope slide, the surface of which is spin-coated at typically 3000 rpm with a layer 5 of an epoxy glue diluted in a solvent such as acetone, to a depth of 0.1 µm. A suitable epoxy glue is NOA 61 from Norland Products Inc., New Brunswick, USA, which is diluted in the ratio of approximately 1:5 (by weight) with acetone. The substrate and superstrate are assembled and the adhesive is cured with UV radiation from a standard UV gun; the assembly is then heated to 120° C. for 5 minutes to bind the substrate and superstrate together.

It is apparent that other techniques can be used to form the wave guiding region 2 in the substrate, and that the choice of substrate is not limited to a photosensitive glass. Standard silica substrates, for example, single crystal quartz, may be reactive ion etched using fluorine based gases such as sulphur hexafluoride, although etch rates are much slower than with wet etched PEG3 glass. The substrate may also be fabricated by other techniques, including reactive ion etching of the wave guiding region and filling channels in a thick polymer resist such as a layer of polymethyl methacrylate (PMMA) formed on a glass substrate. The PMMA is coated with gold, which is then patterned using standard lithographic techniques and selectively etched. This exposes a channel in the gold through which the PMMA is etched by reactive ion etching. The gold is then stripped and the PMMA sandwiched between the glass substrate and a glass superstrate bonded onto it. In the case of a silicon substrate, flame hydrolysis may be used to form a superstrate of silicon dioxide directly onto the substrate, which may then be etched using standard photolithographic techniques.

A further alternative for formation of the substrate is use of a technique such as the LIGA process. This is a highly accurate lithographical method, developed at the research centre Forschungszentrum Karlsruhe GmbH (FZK, formerly KfK) in Karlsruhe, Germany, which involves the use of an X-ray synchrotron to produce moulds for making micro-miniature structures to tolerances of less than 1 µm.

In the LIGA process, a titanium coated ceramic substrate is coated with a thick layer of photoresist, typically PMMA, up to a maximum depth of 1–2 mm. This is then exposed through a mask to high intensity X-rays from a synchrotron. As the X-rays have a characteristic wavelength of only 0.2 nm, diffraction effects are minimised and the resulting resist structure has substantially vertical walls. The resist is developed by standard techniques to open windows through to the substrate, which is electroplated with nickel to the required depth. After stripping all of the remaining resist, a metal microstructure remains which may be used directly or replicated to make moulds, to be applied to polymers such as PMMA to form a substrate with the appropriate rectangular groove pattern. The process is described in detail by M. McCormick, E. Chowanietz and A. Lees; "Microengineering design and manufacture using the LIGA process", IEE Engineering Science and Education Journal, December 1994, pp. 255–262.

Figure 3:
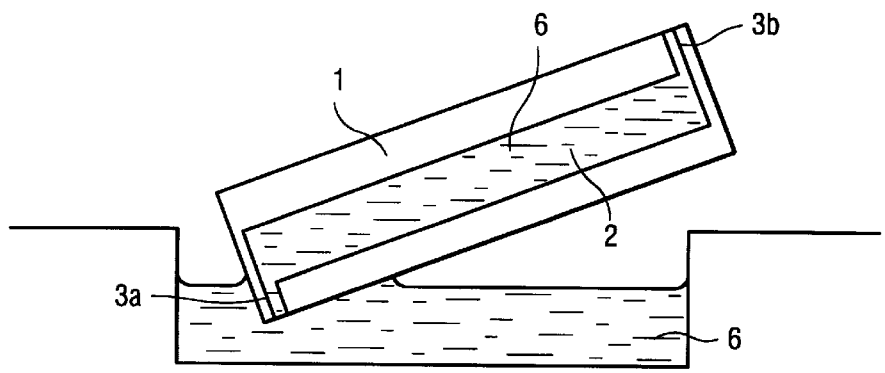
FIG. 3 shows the filling of the wave guiding region with a liquid.

Referring to FIG. 3, the assembled device is filled with a liquid 6 by dipping the end of a filling channel into a boat filled with the liquid. The liquid is drawn into the structure by capillary action and confined within it by surface tension so that it cannot flow out. To avoid any possible liquid loss, the filling channels are sealed by applying further amounts of epoxy and curing as above.

The choice of liquid to be used in the device depends on the desired characteristics. To achieve propagation of optical radiation along the waveguide, the refractive index of the liquid is greater than the index of the substrate surrounding it. For dilute solutions, generally less than 5% w/w, the refractive index of the solution is close to that of the pure solvent. Solvents generally have a refractive index in the range of n=1.45 to 1.6. For example, for toluene, n=1.49. This compares with n=1.5 for the Hoya PEG-3 glass, n=1.49 for PMMA and n=1.6 to 1.7 for polyimides. Polyimides are particularly suitable for applications requiring a stable and inert material which can withstand high temperatures, whilst having a low optical loss at the 1.3 µm/1.5 µm optical wavelengths. Photosensitive polyimides are available which can be patterned in the same way as a photoresist. High refractive index solvents are required for use with materials such as polyimides; these are typically highly aromatic compounds, often with chloro, bromo or iodo or sometimes methyl substituents. Examples include:

| Solvent | Refractive Index at sodium d line |
|---|---|
| 0-chlorophenylmethylketone | 1.685 |
| 3-iodoaniline | 1.6811 |
| 4-aminothioanisole | 1.6395 |
| 9-methylanthracene | 1.6959 |
| 1-bromo-2-iodobenzene | 1.6618 |
| 1,3-dibromobenzene | 1.6083 |
| 1,2-diiodobenzene | 1.7179 |
| 1,2-dibromo-4-nitrobenzene | 1.9835 |
| 1-methylnaphthalene | 1.6170 |
| quinoline | 1.6268 |
| 1-mercaptonaphthalene | 1.6802 |
| 1-methylaminonaphthalene | 1.6722 |
| 1-methoxynaphthalene | 1.6940 |
| 1-iodonaphthtalene | 1.7026 |

The choice of solvent is further dictated by the solubility of the non-linear material in it, any possibility of a chemical reaction between the materials and the optical absorptivity of the solvent at the desired operating wavelength. For example, many of the solvents listed are coloured and may exhibit significant absorption in the infra-red range.

Certain materials are particularly suitable for use in the wave guiding region 2 for optical switching applications. These include metal dithiolene solutions, for example nickel butyl dithiolene, typically with a toluene solvent giving an overall refractive index n of 1.49. Further discussion of dithiolenes for optical switching applications may be found in our U.S. Pat. No. 5,445,767, entitled "Optical Switches".

Other suitable materials for use in the wave guiding region, for example, for optical amplifier applications, are colloidal solutions containing quantum dots, comprising, for example, cadmium sulphide and cadmium and mercury tellurides. Reference is directed to our Publication Number WO 96/10282; "Optical fibre with quantum dots" for further discussion of such materials.

Figure 4:
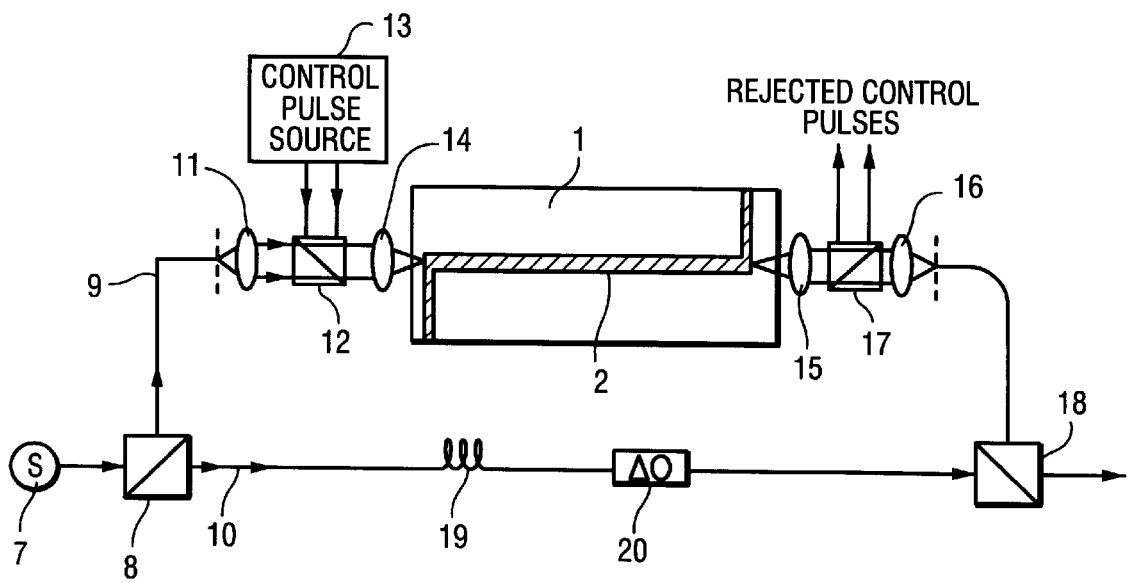
FIG. 4 shows a schematic configuration in which the device is used as an optical switch.

FIG. 4 shows one possible configuration of the device as an optical switch, in the well-known Mach-Zhender configuration. Signal pulses from a source 7 are split in a 50/50 beam splitter 8 and travel down optical fibres 9 and 10 respectively. The signal in fibre 9 passes through a collimating lens 11 and into a prism polarising beam splitter 12 where control pulses generated by source 13 are timed to coincide with the signal pulse to be switched. The control pulses have an orthogonal polarisation to allow them to be easily removed at the output of the switch. The signals pass via a further collimating lens 14 into the wave guiding region 2 of the device 1. Signal pulses that are present when the control pulse is applied will be phase shifted due to the non-linear index change induced in the optically non-linear medium of the liquid filled waveguide. The signal passing through the device 1 passes through collimating lenses 15, 16 and prism polarising beam splitter 17 where control pulses are removed. The signal is then recombined with the signal in reference fibre 10 via the 50/50 splitter 18. The signal passing down the reference fibre 10 passes through a polarisation controller 19 and a static phase shifting device 20, such as a fibre stretcher, to optimise the interference between both copies of the signal pulses. Depending on the static phase shift in the reference fibre 10, the control pulses can either allow or block signal pulses.

An alternative to using polarisation to separate signal and control pulses is to use small differences in wavelength and use either filters or wavelength sensitive couplers to split signal and control pulses.

Figure 5:
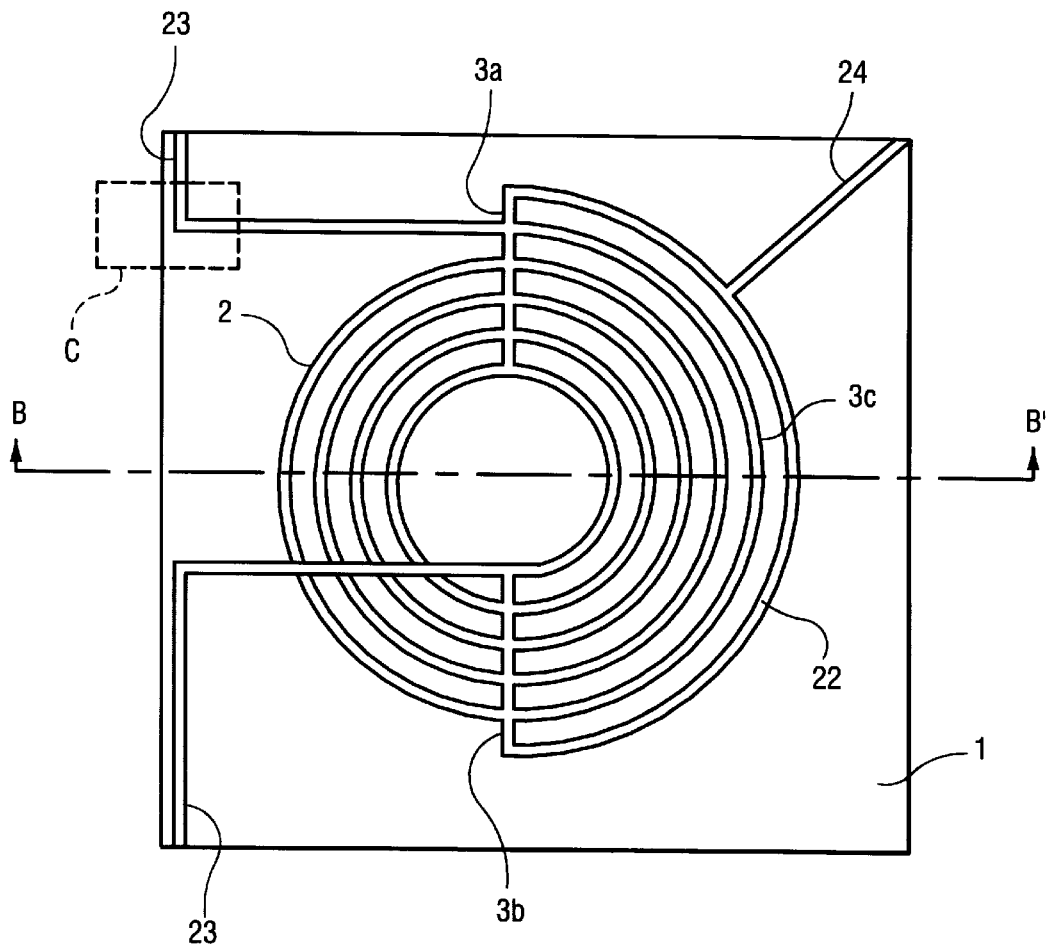
FIG. 5 is a plan view of a device in accordance with a second embodiment of the invention.
Figure 6:
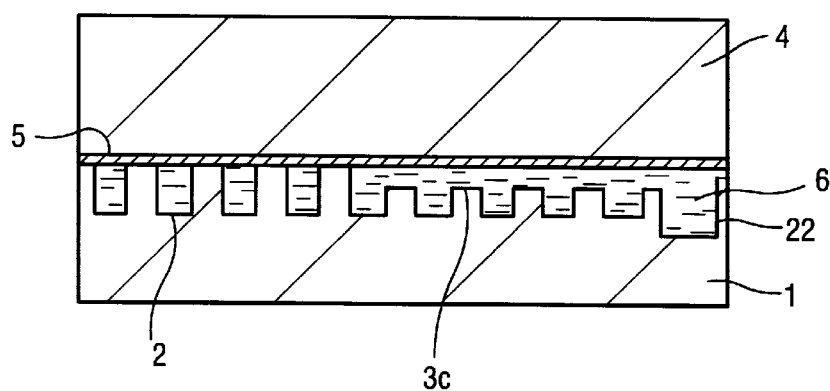
FIG. 6 is a schematic sectional view of the device in FIG. 5 taken along the line B–B'.

In an alternative embodiment shown in FIG. 5, the planar waveguide is fabricated as a coiled structure 2 on a substrate 1, with filling channels 3a, 3b, 3c arranged radially to connect the waveguide coils to a reservoir 22 mounted on the substrate. The substrate may be a 3 inch (7.5 cm) diameter plate of Hoya PEG-3 glass, with typically 5 turns of the waveguide giving an external diameter of 5 cm. Such a structure could be fabricated using the techniques set out above. Alternatively, the waveguide may be etched as a channel in a layer of planar silica. Typically, a 20 $\mu$m layer of silica glass is deposited by flame hydrolysis on a supporting silicon wafer. The glass composition can be varied by changing the feed gases and adding other materials to fine tune the refractive index of the layer. The layer may then be thermally annealed above the glass softening temperature and then processed by conventional photolithographic and etching techniques. Typically, to etch the channels, a metal or silicon nitride masking layer is deposited and then coated with photoresist. This is photolithographically patterned and channels are opened in the mask by etching. The mask is then used to define channels in the underlying silica by reactive ion etching using a fluoride based plasma, for example, $SF_6$. The channels of the guiding region 2 are typically 1–10 $\mu$m deep and 1–10 $\mu$m wide, depending on the solvent/solution being used and the index of the glass. The air outlet channels 23 are 1 $\mu$m wide and up to 10 $\mu$m deep and are sealed after filling by applying a small drop of UV curable adhesive and UV curing it before it can be drawn too far into the device. The filling channel 24 is 10 $\mu$m wide and up to 10 $\mu$m deep. The reservoir channel is typically 20 $\mu$m wide and 10 $\mu$m deep and is fabricated using similar techniques to those employed for the guiding region and inlet channels.

The upper surface of the hollow guides is made the same way as for the device using Hoya PEG-3 glass, namely a glass plate coated with a thin layer of cured adhesive thermally bonded onto the top of the etched planar silica layer.

The device may be filled in a similar way to that described above for the first embodiment, namely by dipping the corner of the device containing the filling channel 24 into a boat filled with the appropriate liquid. The filling channel is then sealed as for the first embodiment.

Silicon offers some advantages as a substrate material, for example, the ability to produce V-grooves in the material to allow alignment of conventional optical fibres with the hollow waveguides. Reference is directed to our PCT Publication Number WO 92/06394 entitled "Self-aligned V grooves and Waveguides". The ability to introduce optical fibres into V-grooves formed directly on the substrate is one form of coupling scheme. Other coupling schemes are described below.

A simple coupling scheme is to bring the guide 2 as close to the substrate edge as possible without risking mechanical damage, typically a few hundred $\mu$m to 2 mm. The edges are optically polished on the outside. Lenses with sufficiently long working distances can then be used to couple in and out of the device, as shown for collimating lenses 14 and 15 in FIG. 4. A suitable lens would be a x10 microscope objective lens, which typically has a working distance of 5–7 mm.

Figure 7:
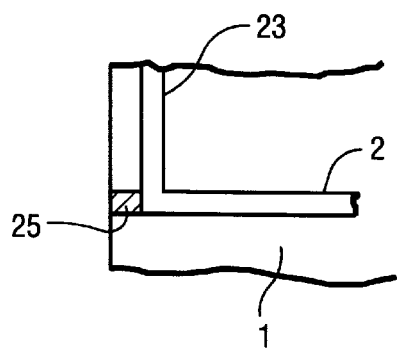
FIG. 7 is an expanded view of the area C shown in FIG. 5, illustrating a possible coupling scheme.

A more elaborate method of coupling is to introduce a short section 25 of waveguide between the edge of the substrate and the etched channel, as illustrated in FIG. 7. This may be done by indiffusion into glass, for example, by immersing a sodium containing glass in molten potassium hydroxide and is exposing the relevant portion of the glass 25 through a metal diffusion mask. The potassium ions will replace the sodium ions in that portion of the glass. The glass is then cut and the edge optically polished. This process extends the optical waveguide out to the physical edge of the device and facilitates butt coupling to a fibre or close coupling to a lensed fibre, which is more efficient than using devices such as discrete lenses and lens mounts.

Alternatively, the channel 2 may be extended beyond the air outlets 23 out to the very edge of the substrate; a polymer plug of material of refractive index close to that of the filling liquid is introduced at the end of each channel, which is then soft polished. This may be done by allowing a viscous photo-polymerisable monomer into the extended portion of the channel and UV curing it at or just before the point that its meniscus reaches the air outlet 23.

The fabrication tolerances of the processes used to produce the waveguides described above, and the dimensions of the resulting waveguides, allow them to be used for single mode operation. For example, for an optical switch or phase shifter, a single mode device is used in which the refractive index of the wave guiding region and the dimensions of the device are carefully controlled to optimise the induced non-linear phase shift. The principles of such optimisation are further described in "Nonlinear polarization coupling and instabilities in single-mode liquid-cored optical fibres", R. Kashyap, N. Finlayson, Opt. Letts., 17(6), 405–407, (1992); "Optical Kerr shutter using organic nonlinear optical materials in capillary waveguides", H. Kanbara, H. Kobayashi K. Kudobera, T. Kurihara, T. Kaino, IEEE Photonics Tech. Letts., 3(9), 795–797, (1991); and "Ultrafast refractive nonlinearity displayed by organic monomode fibre waveguides", R. J. Manning, R. Kashyap, S. N. Oliver, D. Cotter, Proc. International Photonics Research, Topical Meeting, Palm Springs, USA, March 1993.

What is claimed is:

1. A planar optical waveguide comprising:
   an elongate liquid filled wave guiding region on a substrate, the liquid being confined within the waveguide after filling, wherein the ends of the wave guiding region are defined by respective regions of the substrate;

a filling channel for filling the wave guiding region arranged transversely to its length; and said waveguide is configured for single mode operation at either 1.3 μm or 1.5 μm optical transmission windows.

2. A waveguide as in claim 1, wherein each filling channel is substantially sealed so as to confine the liquid within the waveguide.

3. A waveguide as in claim 1, wherein the liquid comprises a colloidal solution of quantum dots.

4. A waveguide as in claim 1, further including a reservoir for storing liquid connected to each channel.

5. A waveguide as in claim 1 including a superstrate mounted on the substrate so as to close the wave guiding region.

6. A method of filling the wave guiding region of a waveguide according to claim 1 comprising dipping the waveguide into a liquid filled reservoir so as to fill it with liquid.

7. A planar optical waveguide comprising:

an elongate liquid filled wave guiding region on a substrate, the liquid being confined within the waveguide after filing, wherein the ends of the wave guiding region are defined by respective regions of the substrate, and including at least two filling channels disposed at opposite ends of the wave guiding region for filling the wave guiding region arranged transversely to its length.

8. A planar optical waveguide comprising:

an elongate liquid filled wave guiding region on a substrate, the liquid being confined within the waveguide after filling, wherein the ends of the wave guiding region are defined by respective regions of the substrate, a filling channel for filling the wave guiding region is arranged transversely to its length; and the wave guiding region is arranged so that each channel is in communication with the wave guiding region in each of at least two separate positions.

9. A planar optical waveguide comprising:

an elongate liquid filled wave guiding region on a substrate, the liquid being confined within the waveguide after filling, wherein the ends of the wave guiding region are defined by respective regions of the substrate, a filling channel for filling the wave guiding region is arranged transversely to its length; and the region of the substrate between an outside edge of the substrate and an end of the wave guiding region comprises a solid waveguide.

10. A planar optical waveguide comprising:

an elongate liquid filled wave guiding region on a substrate, the liquid being confined within the waveguide after filling, wherein the ends of the wave guiding region are defined by respective regions of the substrate, a filling channel for filling the wave guiding region is arranged transversely to its length; and the wave guiding region is in the form of a coil.

11. A waveguide as in claim 10 wherein the wave guiding region is provided with radial filling channels.

12. A planar optical waveguide comprising:

an elongate liquid filled wave guiding region, and a filling channel arranged transversely to its length, wherein the wave guiding region is in the form of a coil having a plurality of turns; and the channel connects to the wave guiding region at each of at least two turns of the coil.

13. A waveguide as in claim 12, comprising a plurality of filling channels each of which connects to the guiding region at each of at least two turns of the coil.

14. A waveguide as in claim 13, wherein each channel connects to each of the turns of the coil.

15. A waveguide as in claim 12, wherein each of the turns of the coil is connected to a plurality of spaced filling channels.

16. A Mach-Zhender configuration including a beamsplitter to direct optical pulses along two optical paths, wherein one of said optical paths includes a waveguide, said waveguide comprising:

an elongate liquid filled wave guiding region on a substrate, the liquid being confined within the waveguide after filling, wherein the ends of the wave guiding region are defined by respective regions of the substrate; and a filling channel for filling the wave guiding region is arranged transversely to its length.

17. A method of manufacturing a planar optical waveguide having a liquid filled wave guiding region, said method comprising:

providing a substrate having an elongate channel for forming the wave guiding region wherein the ends of the channel are defined by respective regions of the substrate;

forming a filling channel in the substrate transversely to the length of the wave guiding region; and filling the wave guiding region with a liquid by capillary action through the filling channel, such that the liquid is confined within the waveguide;

wherein said waveguide is configured at either 1.3 μm or 1.5 μm optical transmission windows.

18. A method as in claim 17, further including sealing the filling channel so as to confine the liquid.

19. A method as in claim 17, wherein the filling channel and wave guiding region are formed simultaneously by etching.

20. A method as in claim 17, including bonding a superstrate onto the substrate so as to close the guiding region.

21. A waveguide produced by filling a waveguiding region of a waveguide according to the method of claim 17.

* * * * *